United States Patent
Smith et al.

(10) Patent No.: US 10,451,002 B2
(45) Date of Patent: Oct. 22, 2019

(54) TRANSLATING COWL THRUST REVERSER THAT PREVENTS UNINTENDED DOOR ROTATION

(71) Applicant: HONEYWELL INTERNATIONAL INC., Morris Plains, NJ (US)

(72) Inventors: Danis Burton Smith, Chandler, AZ (US); Mark Knowles, Mesa, AZ (US); Robert Romano, Tempe, AZ (US); Shawn Alstad, Peoria, AZ (US); David Robinson, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 787 days.

(21) Appl. No.: 15/004,020

(22) Filed: Jan. 22, 2016

(65) Prior Publication Data

US 2017/0211510 A1    Jul. 27, 2017

(51) Int. Cl.
*F02K 1/70*  (2006.01)
*F02K 1/62*  (2006.01)
(Continued)

(52) U.S. Cl.
CPC ............ *F02K 1/625* (2013.01); *F01D 25/24* (2013.01); *F01D 25/28* (2013.01); *F02K 1/62* (2013.01);
(Continued)

(58) Field of Classification Search
CPC ... F02K 1/62; F02K 1/625; F02K 1/68; F02K 1/70; F02K 1/72; F02K 1/766
See application file for complete search history.

(56) References Cited

U.S. PATENT DOCUMENTS

| 3,036,431 A * | 5/1962 | Vdolek | F02K 1/625 239/265.31 |
| 3,167,911 A * | 2/1965 | Fernand | F02K 1/70 415/145 |

(Continued)

FOREIGN PATENT DOCUMENTS

| DE | 102013206595 | * 10/2014 | ............. F02K 1/006 |
| EP | 2881569 A1 | 6/2015 | |

(Continued)

OTHER PUBLICATIONS

Extended EP Search Report for Application No. 17151062.1-1607 dated Jun. 12, 2017.

(Continued)

*Primary Examiner* — Gerald L Sung
*Assistant Examiner* — Marc J Amar
(74) *Attorney, Agent, or Firm* — Lorenz & Kopf, LLP

(57) ABSTRACT

A thrust reverser system for a turbine engine includes a support structure, a transcowl, a door, and an anti-rotation structure. The transcowl is mounted on the support structure and has an inner surface. The transcowl is axially translatable, relative to the support structure, between first and second positions. The door is pivotally coupled to the turbine engine, and has a forward edge and an aft edge. The door is rotatable between stowed and deployed positions when the transcowl translates between the first and second positions, respectively. The anti-rotation structure extends from the transcowl and is disposed adjacent to the aft edge of the door when the transcowl is in the first position and the door is in the stowed position. The anti-rotation structure is configured such that door rotation out of the stowed position only occurs subsequent to or concurrently with translation of the transcowl out of the first position.

11 Claims, 6 Drawing Sheets

(51) Int. Cl.
*F02K 1/68* (2006.01)
*F01D 25/24* (2006.01)
*F01D 25/28* (2006.01)
*F02K 1/72* (2006.01)
*F02K 1/76* (2006.01)

(52) U.S. Cl.
CPC .................. *F02K 1/68* (2013.01); *F02K 1/70* (2013.01); *F02K 1/72* (2013.01); *F02K 1/766* (2013.01); *F05D 2220/32* (2013.01); *F05D 2260/30* (2013.01)

(56) References Cited

U.S. PATENT DOCUMENTS

| | | | | |
|---|---|---|---|---|
| 3,347,467 | A | * | 10/1967 | Anton ........................ F02K 1/04 239/265.13 |
| 3,610,533 | A | * | 10/1971 | Johnson ................ F02K 1/1215 239/265.19 |
| 4,183,478 | A | | 1/1980 | Rudolph |
| 4,340,178 | A | | 7/1982 | Lawson |
| 4,790,495 | A | | 12/1988 | Greathouse et al. |
| 5,819,528 | A | * | 10/1998 | Masson ..................... F02K 1/70 60/226.2 |
| 6,151,885 | A | | 11/2000 | Metezeau et al. |
| 6,311,928 | B1 | | 11/2001 | Presz, Jr. et al. |
| 2011/0167790 | A1 | * | 7/2011 | Cloft ......................... F02K 1/68 60/226.2 |
| 2016/0160798 | A1 | * | 6/2016 | Guerin ..................... F02K 1/09 239/265.19 |
| 2017/0284337 | A1 | * | 10/2017 | Schrell ................... F02K 1/605 |
| 2017/0298871 | A1 | * | 10/2017 | Sawyers-Abbott ..... F01D 25/24 |

FOREIGN PATENT DOCUMENTS

| | | | |
|---|---|---|---|
| EP | 3081796 A1 | 10/2016 | |
| EP | 3141731 A1 | 3/2017 | |
| FR | 3018863 A1 | 9/2015 | |
| WO | 2015019007 A1 | 2/2015 | |
| WO | WO 2015145056 A1 * | 10/2015 | ............... F02K 1/72 |

OTHER PUBLICATIONS

European Patent Office, Examination Report for Application No. 17151062.1 dated Apr. 12, 2019.

* cited by examiner

-- PRIOR ART --

-- PRIOR ART --

-- PRIOR ART --

-- PRIOR ART --

TRANSLATING COWL THRUST REVERSER THAT PREVENTS UNINTENDED DOOR ROTATION

TECHNICAL FIELD

The present invention relates to a thrust reverser system for a turbine engine, and more particularly to a thrust reverser system that is configured to prevent unintended door rotation.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. These types of thrust reversers typically use two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

Transcowl type thrust reversers transition from the forward thrust state to the reverse thrust state by translating the transcowl aft so as to open a reverse thrust aperture, and simultaneously rotating a set of doors so as to obstruct the forward thrust nozzle. This coordinated motion between the transcowl and the doors is typically achieved by the use of a linkage rod arrangement, which connects the doors to the transcowl so that translational motion of the transcowl causes rotational motion of the doors.

Typically, these types of thrust reverser systems are equipped with a redundant locking system to ensure that inadvertent in-flight deployment is extremely improbable. This locking system is typically arranged to prevent the transcowl from translating aft until it is commanded to do so. Similarly, the linkage rods connecting the doors to transcowl prevent the doors from rotating until commanded. However, even with this arrangement, and though highly unlikely, the doors could rotate toward the deployed position if a linkage rod failure or malfunction is postulated to occur.

Hence, there is a need for a supplemental means for ensuring that the thrust reverser system doors cannot rotate toward the deployed position until commanded to do so, even in the highly unlikely, yet postulated event of a linkage rod malfunction. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser system for a turbine engine includes a support structure, a transcowl, a door, and an anti-rotation structure. The support structure is configured to be mounted to the engine. The transcowl is mounted on the support structure and has an inner surface. The transcowl is axially translatable, relative to the support structure, between a first position, in which the transcowl abuts the support structure, and a second position, in which the transcowl is displaced from the support structure to form an aperture between the transcowl and the support structure. The door is pivotally coupled to the turbine engine, and has a forward edge and an aft edge. The door is rotatable between a stowed position and a deployed position when the transcowl translates between the first position and the second position, respectively. The door is configured, when it is in the deployed position, to redirect engine airflow through the aperture to thereby generate reverse thrust. The anti-rotation structure extends from the transcowl and is disposed adjacent to the aft edge of the door when the transcowl is in the first position and the door is in the stowed position. The anti-rotation structure is configured such that door rotation out of the stowed position can only occur subsequent to or concurrently with translation of the transcowl out of the first position.

In another embodiment, a thrust reverser system for a turbine engine includes a support structure, a transcowl, a plurality of doors, and an anti-rotation structure. The support structure is configured to be mounted to the engine. The transcowl is mounted on the support structure and has an inner surface. The transcowl is axially translatable, relative to the support structure, between a first position, in which the transcowl abuts the support structure, and a second position, in which the transcowl is displaced from the support structure to form an aperture between the transcowl and the support structure. The doors are pivotally coupled to the turbine engine, and each door has a forward edge and an aft edge. Each door is rotatable between a stowed position and a deployed position when the transcowl translates between the first position and the second position, respectively. Each door is configured, when it is in the deployed position, to redirect engine airflow through the aperture to thereby generate reverse thrust. The anti-rotation structure extends from the transcowl and is disposed adjacent the aft edge of each door when the transcowl is in the first position and each door is in the stowed position. The anti-rotation structure is configured such that door rotation out of the stowed position can only occur subsequent to or concurrently with translation of the transcowl out of the first position.

In yet another embodiment, a turbofan engine includes a gas turbine engine and a nacelle coupled to and at least partially surrounding the gas turbine engine. The nacelle comprises a thrust reverser system that includes a support structure, a transcowl, a plurality of doors, and an anti-rotation structure. The support structure is coupled to the gas turbine engine. The transcowl is mounted on the support structure and has an inner surface. The transcowl is axially translatable, relative to the support structure, between a first position, in which the transcowl abuts the support structure, and a second position, in which the transcowl is displaced from the support structure to form an aperture between the transcowl and the support structure. The doors are pivotally coupled to the turbine engine, and each door has a forward edge and an aft edge. Each door is rotatable between a stowed position and a deployed position when the transcowl translates between the first position and the second position, respectively. Each door is configured, when it is in the deployed position, to redirect engine airflow through the aperture to thereby generate reverse thrust. The anti-rotation structure extends from the transcowl and is disposed adjacent the aft edge of each door when the transcowl is in the first position and each door is in the stowed position. The anti-rotation structure is configured such that door rotation out of the stowed position can only occur subsequent to or concurrently with translation of the transcowl out of the first position.

Furthermore, other desirable features and characteristics of the thrust reverser system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
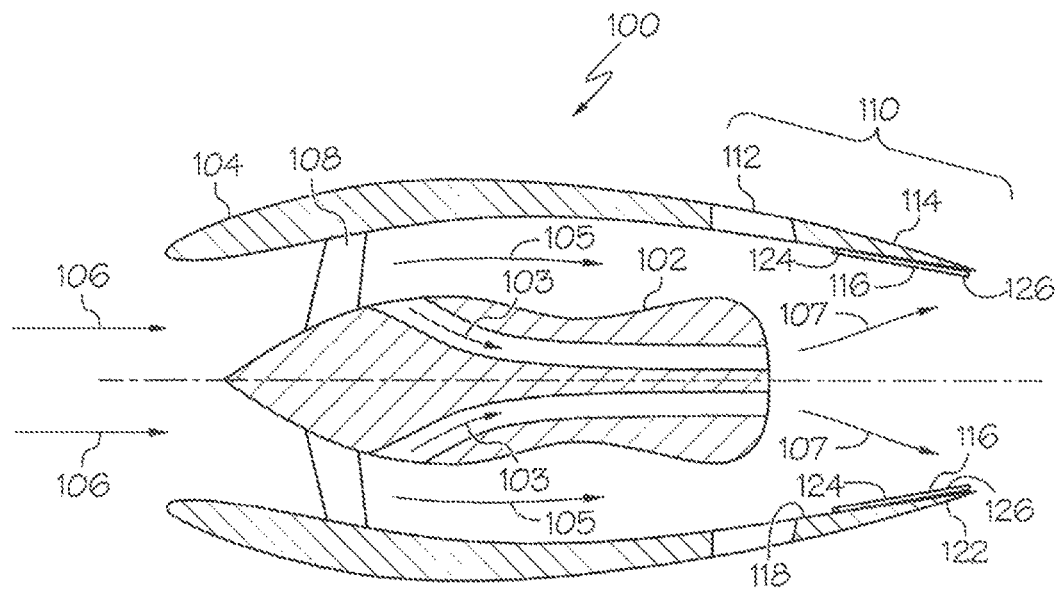
FIGS. 1 and 2 depict a turbofan engine equipped with a mixed flow thrust reverser system, and with the thrust reverser system in a stowed position and deployed position, respectively.
Figure 2:
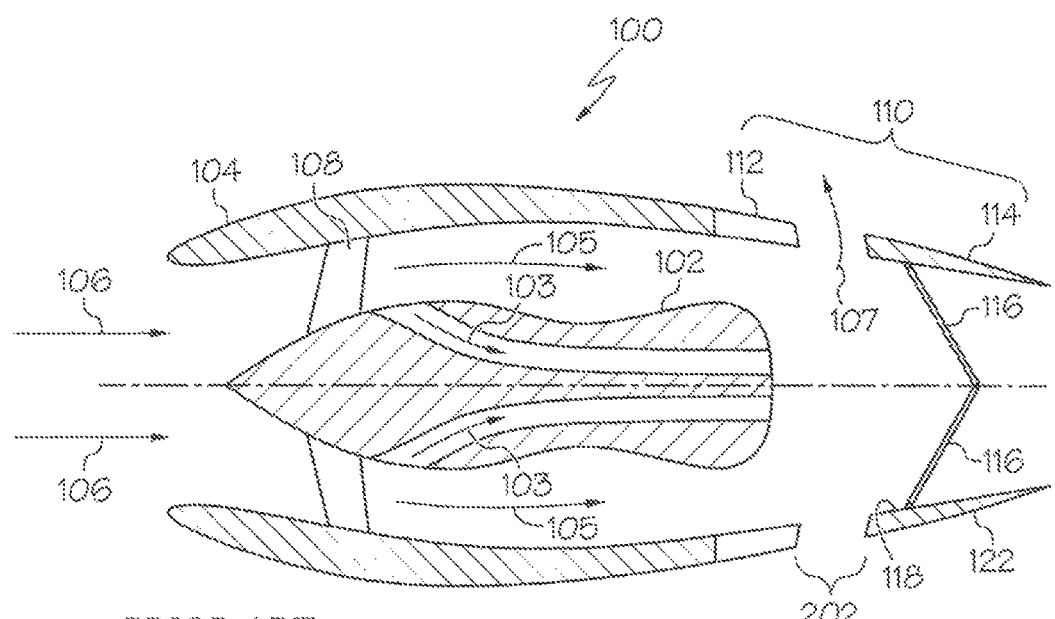
Figure 3:
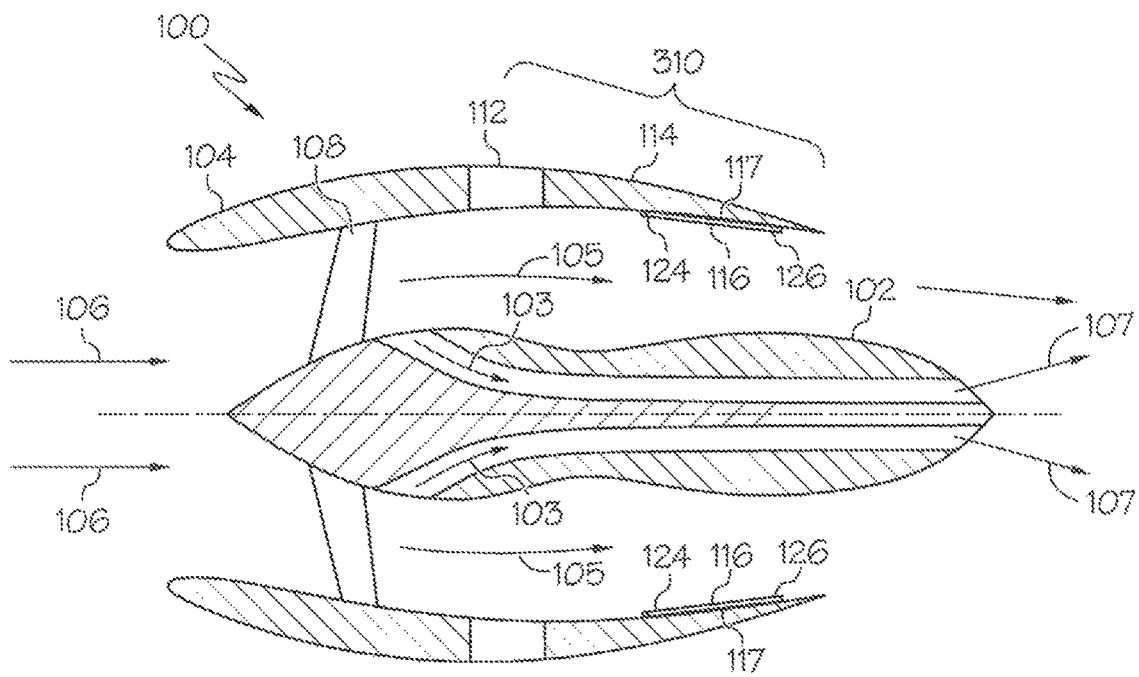
FIGS. 3 and 4 depict a turbofan engine equipped with a fan flow thrust reverser system, and with the thrust reverser system in a stowed position and deployed position, respectively.
Figure 4:
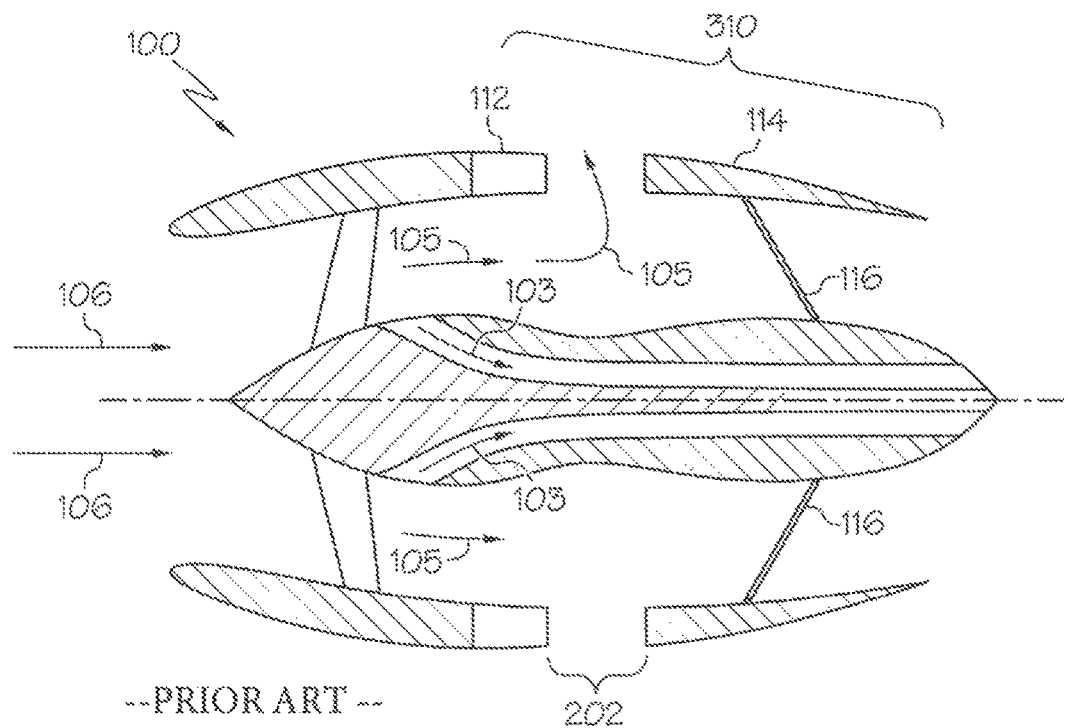

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a first position, which is the position depicted in FIG. 1, and a second position, which is the position depicted in FIG. 2. In the first position the transcowl 114 abuts the support structure 112, and in the second position the transcowl 114 is displaced from the support structure 112 to form an aperture 202 between the transcowl 114 and the support structure 112.

Each of the one or more doors 116, at least in the depicted embodiment, is pivotally coupled to the support structure 112. It will be appreciated, however, that in other embodiments each door 116 could instead be coupled to any component that is rigidly attached to the turbofan engine. Regardless, each door 116 has a forward edge 124 and an aft edge 126, and is rotatable between a stowed position, which is the position depicted in FIG. 1, and a deployed position, which is the position depicted in FIG. 2. More specifically, each door 116 is rotatable between the stowed position and the deployed position when the transcowl 114 translates between the first position and the second position, respectively. As is generally known, each door 116 is configured, when it is in the deployed position, to redirect at least a portion of the engine airflow through the aperture 202 to thereby generate reverse thrust. In particular, at least a portion of the engine exhaust flow 107 (e.g., mixed core flow 103 and fan flow 105) is redirected through the aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 has a forward edge 124 and an aft edge 126, and is rotatable between a stowed position, which is the position depicted in FIG. 3, and a deployed position, which is the position depicted in FIG. 4. Similarly, each door 116 is rotatable between the stowed position and the deployed position when the transcowl 114 translates between the first position and the second position, respectively. As is generally known, each door 116 is configured, when it is in the deployed position, to redirect at least a portion of the engine airflow through the aperture 202 to thereby generate reverse thrust. In this case, however, only fan bypass flow 105 is redirected through the aperture 202.

Figure 5:
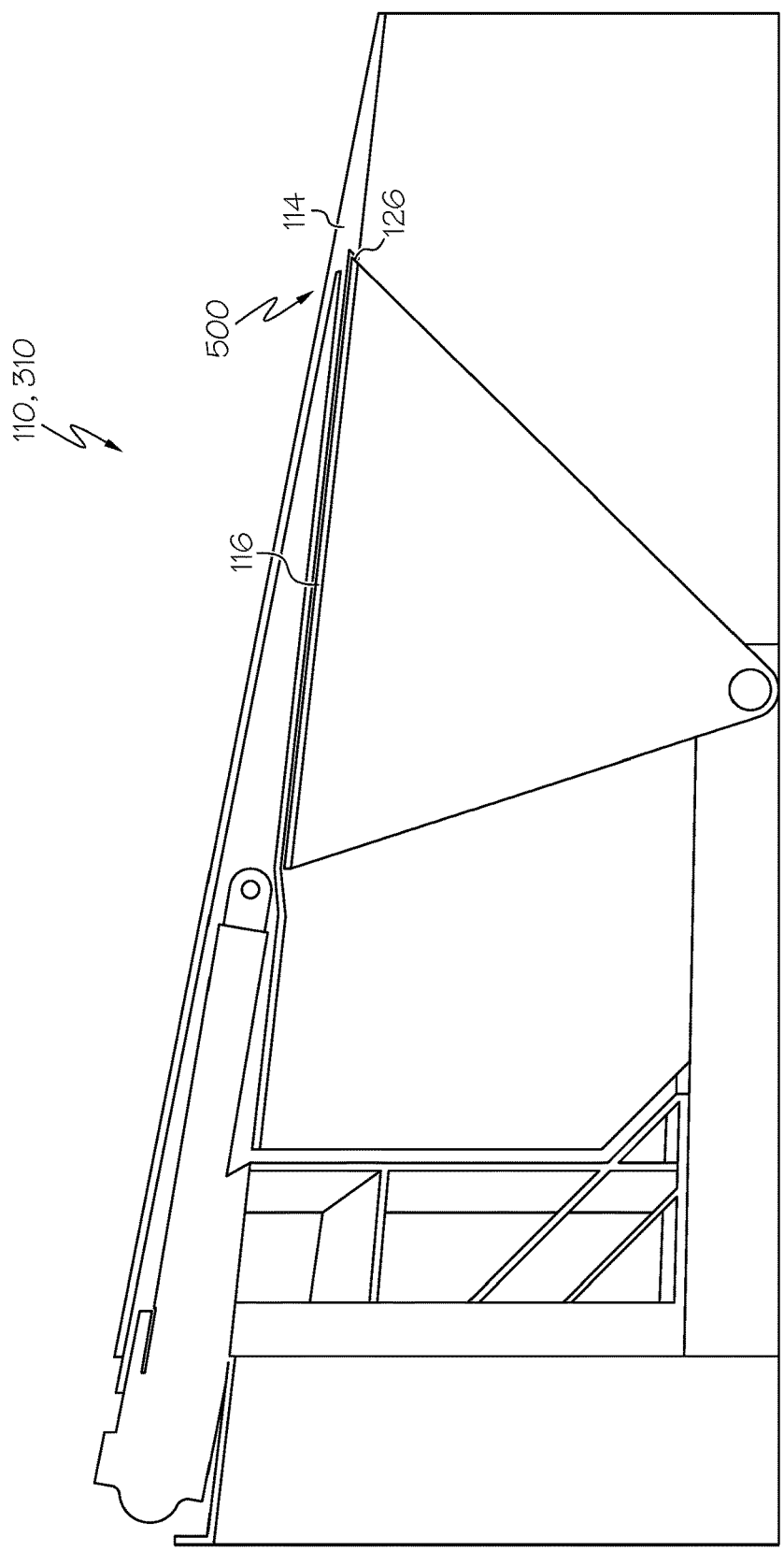
FIG. 5 depicts a cross section view of a portion of one embodiment of a thrust reverser system that may be implemented in the turbofan engines of FIGS. 1-4.

Turning now to FIG. 5, it is noted that regardless of which of the above-described thrust reverser systems 110, 310 is implemented in the turbofan engine 100, both systems 110, 310 include an anti-rotation structure 500. The anti-rotation structure 500 extends from the transcowl 114 and is disposed adjacent to the aft edge 126 of each door 116 when the transcowl 114 is in the first position, and when each door 116 is in the stowed position. The anti-rotation structure 500 is configured such that door rotation out of the stowed position can only occur subsequent to or concurrently with translation of the transcowl 114 out of the first position.

Figure 6:
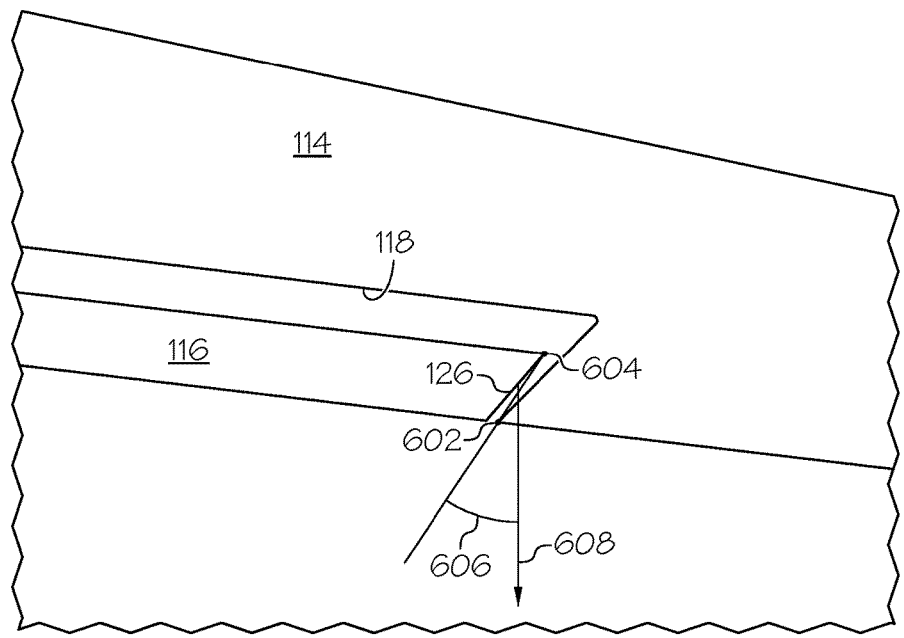
FIGS. 6-8 depict close-up, cross section views of one embodiment of an anti-rotation structure that may be implemented in the thrust reverser systems of FIGS. 1-5.

It will be appreciated that the anti-rotation structure 500 may be variously configured and implemented. In the depicted embodiment, and as shown more clearly in FIG. 6, the anti-rotation structure 500 is formed integrally with the transcowl 114. More specifically, the depicted anti-rotation structure 500 is formed integrally on, and extends inwardly from, the inner surface 118 of the transcowl 114, and is shaped such that it has a forward most edge 602. As FIG. 6 also depicts, the aft edge 126 of each door 116 is shaped such that, when the door 116 is in the stowed position, which is the position depicted in FIG. 6, the door 116 has an aft most edge 604. Moreover, the forward most edge 602 of the anti-rotation structure 500 and the aft most edge 604 of each door 116 are shaped such that a line drawn between the aft most edge 604 of each door 116 and the forward most edge 602 of the anti-rotation structure 500 is disposed at an acute angle 606 relative to the rotational path 608 of the door 116. Although the specific value of the acute angle 606 may vary, it is preferably greater than 30-degrees (0.52 radians).

Figure 7:
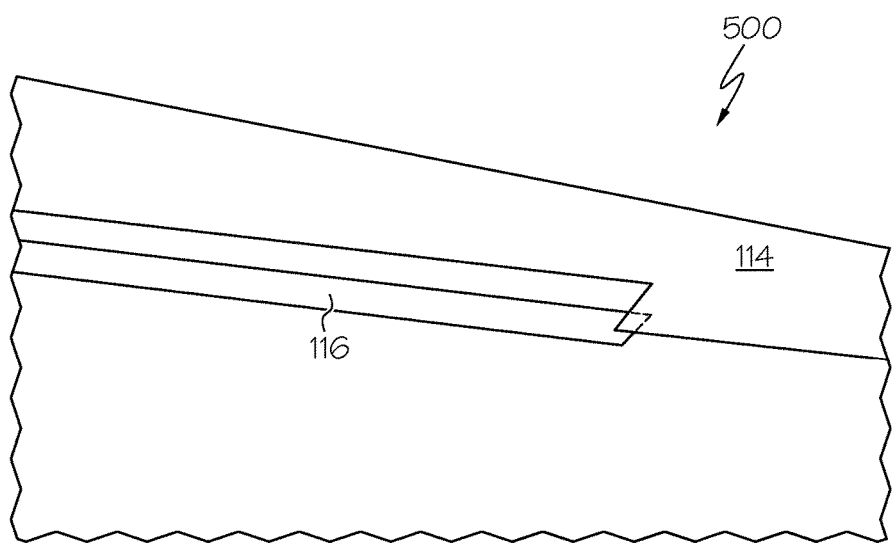
Figure 8:
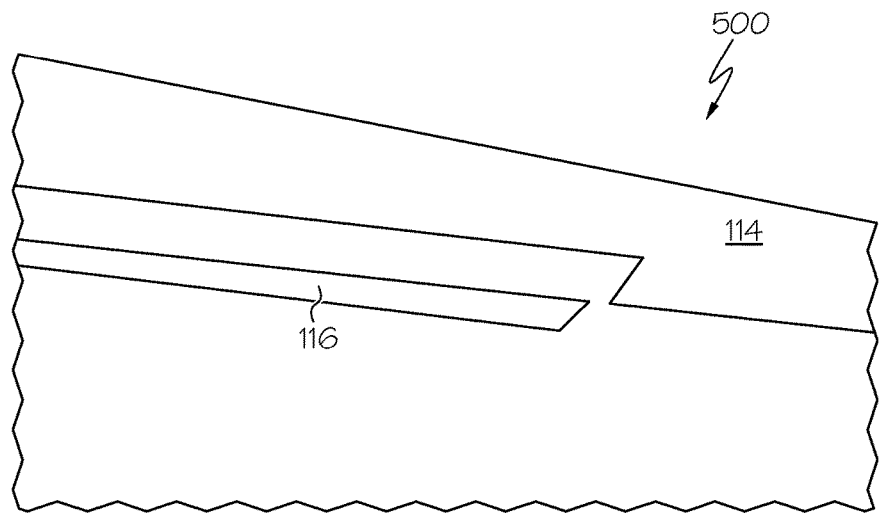

With the above-described configuration, and as FIG. 7 depicts, when the transcowl 114 is in the first position and the doors 116 are in the stowed position, the anti-rotation structure 500 forms an interference fit with the doors 116 to prevent unintended door rotation. However, as FIG. 8 depicts, when the transcowl 114 translates toward the second position, a clearance is provided between the forward most edge 602 of the anti-rotation structure 500 and the aft most edge 604 of each door 116 that allows each door 116 to rotate.

It was previously noted that the anti-rotation structure 500 may be variously configured and implemented. Indeed, in other embodiments, such as the one depicted in FIGS. 9-11, the anti-rotation structure 500 is at least partially formed as a separable component that is attached to the transcowl 114. With this embodiment, the transcowl 114 includes a portion 902 that is contoured to flare radially outwardly and then extend radially inwardly, and the anti-rotation structure 500 includes a structural segment 904. The structural segment 904 is coupled to the inner surface 118 of the transcowl 114, and has an aft end 906 and a forward end 908. The aft end 906 of the structural segment 904 is coupled to the inner surface 118 of the transcowl 114 aft of where the transcowl 114 extends radially inwardly. The forward end 908 of the structural segment 904 is disposed forward of where the transcowl 114 extends radially inwardly, to thereby form a door retention cavity 912.

Figure 9:
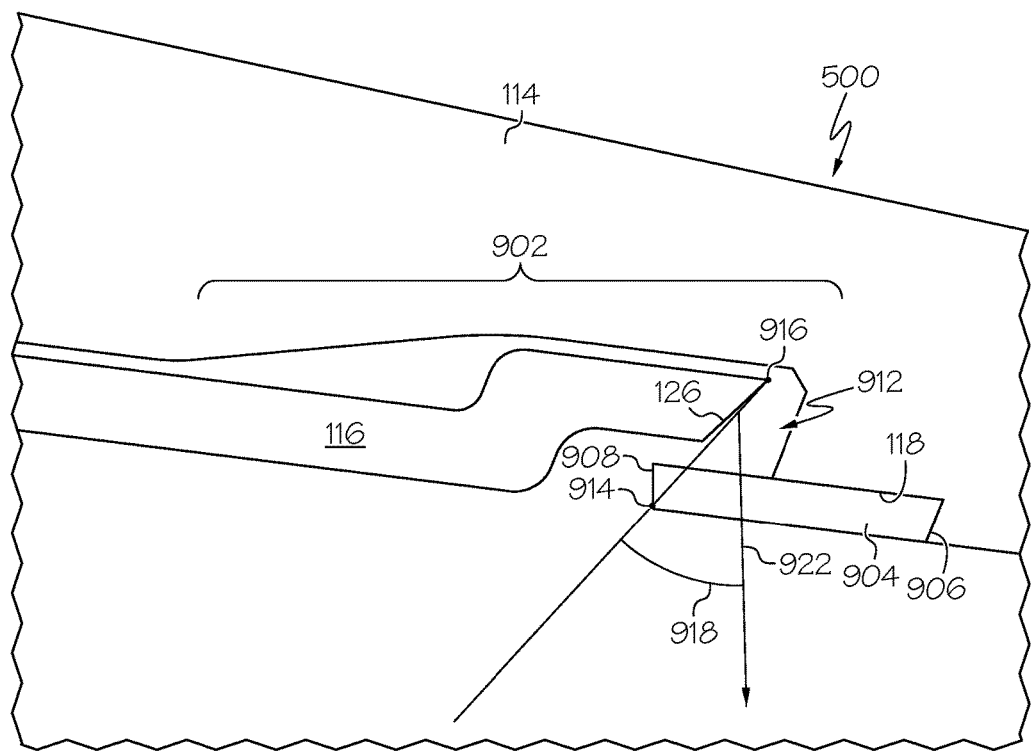
FIGS. 9-11 depict close-up, cross section views of another embodiment of an anti-rotation structure that may be implemented in the thrust reverser systems of FIGS. 1-5.

As FIG. 9 also depicts, with this embodiment the structural segment 904 is shaped such that the forward end 908 has a forward most edge 914 and, as with the previously described embodiment, the aft edge 126 of each door 116 is shaped such that, when it is in the stowed position, which is the position depicted in FIG. 9, it has an aft most edge 916. Similar to the previous embodiment, the forward most edge 914 of the structural segment 904 and the aft most edge 916 of each door 116 are shaped such that a line drawn between the aft most edge 916 of each door 116 and the forward most edge 914 of the structural segment 904 is disposed at an acute angle 918 relative to the rotational path 922 of the door 116. Although the specific value of the acute angle 918 may vary, it is preferably greater than 30-degrees (0.52 radians).

Figure 10:
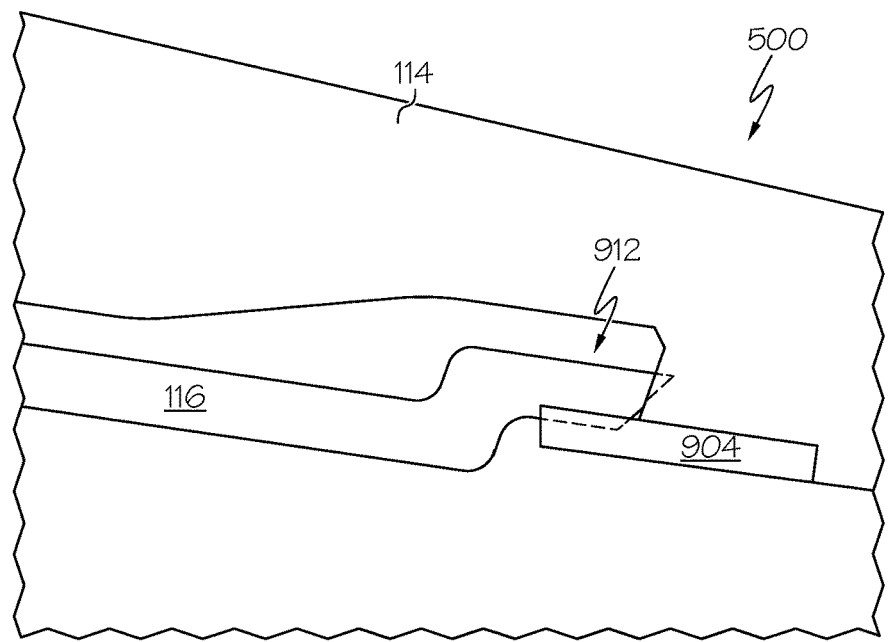
Figure 11:
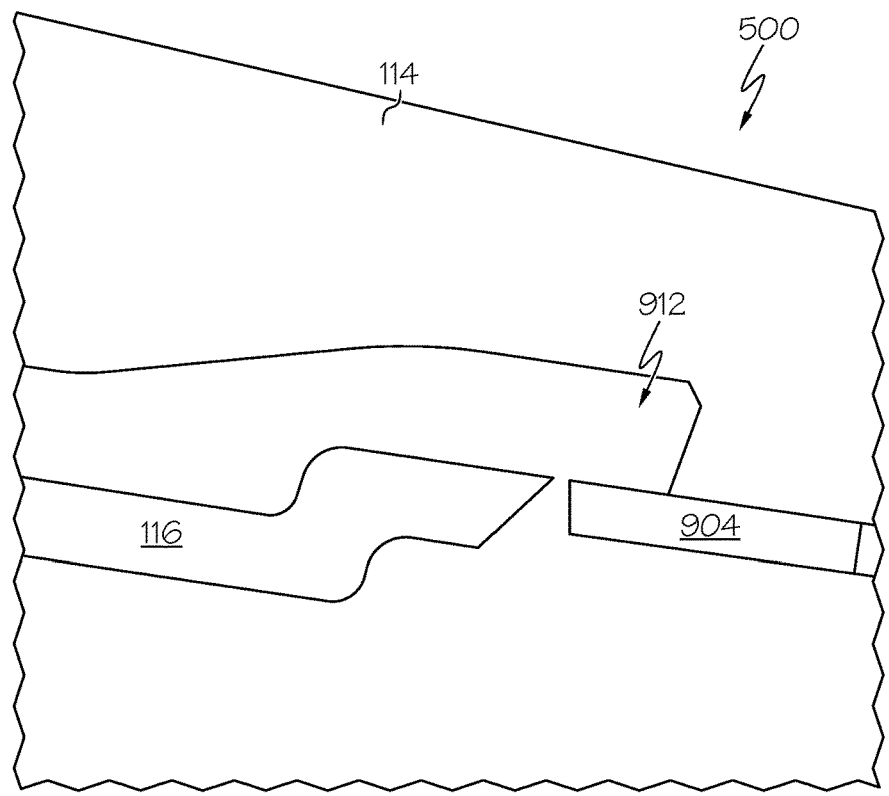

With the above-described configuration, and as FIG. 10 depicts, when the transcowl 114 is in the first position and the doors 116 are in the stowed position, the doors 116 are disposed within the door retention cavity 912, and form an interference fit with the anti-rotation structure 500 to prevent unintended door rotation. However, as FIG. 11 depicts, when the transcowl 114 translates toward the second position, a clearance is provided between the forward most edge 914 of the structural segment 904 and the aft most edge 916 of each door 116 that allows each door 116 to rotate.

The anti-rotation structures 500 described herein ensure that thrust reverser system doors 116 cannot rotate toward the deployed position until commanded to do so, even in the highly unlikely, yet postulated event of a linkage rod malfunction.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser system for a turbine engine, comprising:
   a support structure configured to be mounted to the engine;
   a transcowl mounted on the support structure and having an inner surface, the transcowl axially translatable, relative to the support structure, between a first position, in which the transcowl abuts the support structure, and a second position, in which the transcowl is displaced from the support structure to form an aperture between the transcowl and the support structure;
   a door pivotally coupled to the turbine engine, the door having a forward edge and an aft edge, the door rotatable between a stowed position and a deployed position when the transcowl translates between the first position and the second position, respectively, the door configured, when the door is in the deployed position, to redirect engine airflow through the aperture to thereby generate reverse thrust; and
   an anti-rotation structure extending from the transcowl and disposed adjacent the aft edge of the door when the transcowl is in the first position and the door is in the stowed position, the anti-rotation structure configured to form an interference fit with the door when the door is in the stowed position, such that door rotation out of the stowed position can only occur subsequent to or concurrently with translation of the transcowl out of the first position when a clearance is provided between the anti-rotation structure and the aft edge of the door that allows the door rotation out of the stowed position,
   wherein:
      the transcowl includes a portion that is contoured to flare radially outwardly and then extend radially inwardly, and
      the anti-rotation structure is formed as a separable component attached to and translatable with the transcowl and comprises a structural segment attached to the inner surface of the transcowl, the structural segment having an aft end and a forward end, the aft end directly attached to the inner surface aft of where the transcowl extends radially inwardly, the forward end disposed forward of where the transcowl extends radially inwardly, to thereby form a door retention cavity.

2. The thrust reverser system of claim 1, wherein the door is disposed within the door retention cavity when the transcowl is in the first position and the door is in the stowed position.

3. The thrust reverser system of claim 1, wherein:
   the aft edge of the door is shaped such that, when the door is in the stowed position, the door has an aft most edge; and
   the anti-rotation structure is shaped such that it has a forward most edge; and
   when the door is in the stowed position, a line drawn between the aft most edge of the door and the forward most edge of the anti-rotation structure is disposed at an acute angle relative to a vector that (i) extends from a mid-point of the aft edge of the door and (ii) is tangent to a rotational path of the door.

4. The thrust reverser system of claim 3, wherein the acute angle is greater than 30 degrees.

5. A thrust reverser system for a turbine engine, comprising:
   a support structure configured to be mounted to the engine;
   a transcowl mounted on the support structure and having an inner surface, the transcowl axially translatable, relative to the support structure, between a first position, in which the transcowl abuts the support structure, and a second position, in which the transcowl is displaced from the support structure to form an aperture between the transcowl and the support structure;
   a plurality of doors pivotally coupled to the turbine engine, each door having a forward edge and an aft edge, each door rotatable between a stowed position and a deployed position when the transcowl translates between the first position and the second position, respectively, each door configured, when each door is in the deployed position, to redirect engine airflow through the aperture to thereby generate reverse thrust; and
   an anti-rotation structure extending from the transcowl and disposed adjacent the aft edge of each door when the transcowl is in the first position and each door is in the stowed position, the anti-rotation structure configured to form an interference fit with each door when each door is in the stowed position, such that door rotation out of the stowed position can only occur subsequent to or concurrently with translation of the transcowl out of the first position when a clearance is provided between the anti-rotation structure and the aft edge of each door that allows rotation of each door out of the stowed position, wherein:
the transcowl includes a portion that is contoured to flare radially outwardly and then extend radially inwardly, and the anti-rotation structure is formed as a separable component attached to and translatable with the transcowl and comprises a structural segment attached to the inner surface of the transcowl, the structural segment having an aft end and a forward end, the aft end directly attached to the inner surface aft of where the transcowl extends radially inwardly, the forward end disposed forward of where the transcowl extends radially inwardly, to thereby form a door retention cavity.

6. The thrust reverser system of claim 5, wherein each door is disposed within the door retention cavity when the transcowl is in the first position and each door is in the stowed position.

7. The thrust reverser system of claim 5, wherein:
the aft edge of each door is shaped such that, when each door is in the stowed position, each door has an aft most edge; and
the anti-rotation structure is shaped such that it has a forward most edge; and
when each door is in the stowed position, a line drawn between the aft most edge of each door and the forward most edge of the anti-rotation structure is disposed at an acute angle relative to a vector that (i) extends from a mid-point of the aft edge of each door and (ii) is tangent to a rotational path of the door.

8. The thrust reverser system of claim 7, wherein the acute angle is greater than 30 degrees.

9. A turbofan engine, comprising:
a gas turbine engine; and
a nacelle coupled to and at least partially surrounding the gas turbine engine, the nacelle comprising a thrust reverser system that includes:
a support structure coupled to the gas turbine engine;
a transcowl mounted on the support structure and having an inner surface, the transcowl axially translatable, relative to the support structure, between a first position, in which the transcowl abuts the support structure, and a second position, in which the transcowl is displaced from the support structure to form an aperture between the transcowl and the support structure;

a plurality of doors pivotally coupled to the turbine engine, each door having a forward edge and an aft edge, each door rotatable between a stowed position and a deployed position when the transcowl translates between the first position and the second position, respectively, each door configured, when each door is in the deployed position, to redirect engine airflow through the aperture to thereby generate reverse thrust; and an anti-rotation structure extending from the transcowl and disposed adjacent the aft edge of each door when the transcowl is in the first position and each door is in the stowed position, the anti-rotation structure configured to form an interference fit with each door when each door is in the stowed position, such that door rotation out of the stowed position can only occur subsequent to or concurrently with translation of the transcowl out of the first position when a clearance is provided between the anti-rotation structure and the aft edge of each door that allows rotation of each door out of the stowed position, wherein:
the transcowl includes a portion that is contoured to flare radially outwardly and then extend radially inwardly, the anti-rotation structure is formed as a separable component attached to and translatable with the transcowl and comprises a structural segment attached to the inner surface of the transcowl, the structural segment having an aft end and a forward end, the aft end directly attached to the inner surface aft of where the transcowl extends radially inwardly, the forward end disposed forward of where the transcowl extends radially inwardly, to thereby form a door retention cavity, and each door is disposed within the door retention cavity when the transcowl is in the first position and the door is in the stowed position.

10. The turbofan engine of claim 9, wherein:
the aft edge of each door is shaped such that, when each door is in the stowed position, each door has an aft most edge; and
the anti-rotation structure is shaped such that it has a forward most edge; and
when each door is in the stowed position, a line drawn between the aft most edge of each door and the forward most edge of the anti-rotation structure is disposed at an acute angle relative to a vector that (i) extends from a mid-point of the aft edge of each door and (ii) is tangent to a rotational path of the door.

11. The turbofan engine of claim 10, wherein the acute angle is greater than 30 degrees.

* * * * *